(12) United States Patent
Romero (10) Patent No.: US 10,597,889 B1
(45) Date of Patent: Mar. 24, 2020

(54) ROOF SECURING SYSTEM AND METHOD FOR PROVIDING ADDITIONAL STRENGTH TO ROOFS DURING ADVERSE CLIMATIC CONDITIONS

(71) Applicant: GG & CR Investments, LLC, Miami, FL (US)

(72) Inventor: Carlos Romero, Miami, FL (US)

( * ) Notice: Subject to any disclaimer, the term of this patent is extended or adjusted under 35 U.S.C. 154(b) by 0 days.

(21) Appl. No.: 16/053,358

(22) Filed: Aug. 2, 2018

(51) Int. Cl.
*E04H 9/14* (2006.01)
*E04B 1/92* (2006.01)

(52) U.S. Cl.
CPC .................. *E04H 9/14* (2013.01); *E04B 1/92* (2013.01)

(58) Field of Classification Search
CPC ..................................... E04H 9/14; E04B 1/92
See application file for complete search history.

(56) References Cited

U.S. PATENT DOCUMENTS

| | | | | |
|---|---|---|---|---|
| 3,449,874 | A * | 6/1969 | Beaupre | E02D 5/80 52/149 |
| 5,522,184 | A * | 6/1996 | Oviedo-Reyes | E02D 5/801 52/23 |
| 5,537,786 | A * | 7/1996 | Lozier | E04H 9/14 52/23 |
| 5,570,545 | A * | 11/1996 | Adams | E04H 9/14 52/23 |
| 5,623,788 | A * | 4/1997 | Bimberg | E04B 7/02 52/23 |
| 5,687,512 | A * | 11/1997 | Spoozak | E04H 9/14 52/23 |
| 5,819,477 | A * | 10/1998 | Gaffney | E04H 9/14 52/23 |
| 5,881,499 | A * | 3/1999 | Luzzi | E04H 9/14 52/23 |
| 5,970,677 | A | 10/1999 | Masters | |
| 6,865,852 | B2 * | 3/2005 | Gower | E04H 9/14 135/90 |
| 6,988,346 | B2 | 1/2006 | Shamroukh et al. | |
| 7,310,913 | B2 * | 12/2007 | Pierce | E04H 9/14 52/23 |
| 7,392,620 | B1 * | 7/2008 | Watson, Jr. | E04H 9/14 52/4 |
| 7,578,100 | B2 * | 8/2009 | Sicurella | E04H 9/14 52/4 |
| 7,600,347 | B2 * | 10/2009 | Lindstrom | E04H 9/14 52/4 |
| 7,805,891 | B2 * | 10/2010 | Lozier | E04H 9/14 52/23 |
| 8,272,171 | B2 * | 9/2012 | Curry, III | E04H 9/14 52/23 |

(Continued)

*Primary Examiner* — Rodney Mintz
(74) *Attorney, Agent, or Firm* — Sanchelima & Associates, P.A.; Christian Sanchelima; Jesus Sanchelima (57) ABSTRACT

The present invention is a roof securing system with fewer components and easy-to install and maintain securing methods for providing additionally strength to a roof of a building during adverse climatic conditions. Roof securing system of the present invention includes a plurality of securing sets positioned at pre-determined distances on rooftop. More closely adjacently disposed securing sets are positioned more secured roof securing system will be. Each securing set include a strap that sits on rooftop, wall mounting fixtures and at least one anchor fasteners. Each wall mounting fixture holds strap and are tightly secured to side walls of building by using anchor fastener(s). Holding of strap enables strap to grip rooftop with remaining building structure and hence enable roof to maintain its position during adverse climatic condition.

11 Claims, 9 Drawing Sheets

(56) References Cited

U.S. PATENT DOCUMENTS

| | | | | |
|---|---|---|---|---|
| 9,212,500 | B2 * | 12/2015 | Siegmund | E04H 9/14 |
| 9,598,860 | B2 * | 3/2017 | Davis | E04B 1/94 |
| 2001/0037615 | A1 * | 11/2001 | Riech | E04H 9/14 52/79.1 |
| 2002/0134414 | A1 * | 9/2002 | Gower | E04H 9/14 135/90 |
| 2002/0166289 | A1 * | 11/2002 | Oviedo-Reyes | E04B 7/00 52/4 |
| 2003/0079419 | A1 * | 5/2003 | Shamroukh | E04B 7/022 52/79.1 |
| 2007/0000183 | A1 * | 1/2007 | Logan | E02D 5/803 52/3 |
| 2007/0022672 | A1 * | 2/2007 | Bachynski | E04H 9/14 52/90.1 |
| 2007/0101676 | A1 * | 5/2007 | Newgard, Jr. | E04H 9/14 52/746.11 |
| 2007/0277460 | A1 * | 12/2007 | Atwood | E04H 9/14 52/302.6 |
| 2008/0040981 | A1 * | 2/2008 | Lindstrom | E04H 9/14 52/30 |
| 2008/0083169 | A1 * | 4/2008 | Sicurella | E04H 9/14 52/4 |
| 2009/0000211 | A1 * | 1/2009 | Lozier | E04H 9/14 52/23 |
| 2011/0036020 | A1 * | 2/2011 | Curry, III | E04H 9/14 52/23 |
| 2012/0090249 | A1 * | 4/2012 | Schor | E04H 9/14 52/4 |
| 2013/0318886 | A1 * | 12/2013 | Hester | E04H 9/14 52/2.26 |
| 2014/0311049 | A1 * | 10/2014 | Siegmund | E04H 9/14 52/23 |

* cited by examiner

ROOF SECURING SYSTEM AND METHOD FOR PROVIDING ADDITIONAL STRENGTH TO ROOFS DURING ADVERSE CLIMATIC CONDITIONS

BACKGROUND OF THE INVENTION

1. Field of the Invention

The present invention relates to a roof securing system and method that provides additional strength to a roof of a residential or commercial building during adverse climatic conditions and, more particularly, to an easy-to-install and maintain roof securing system that provides additional strength for maintaining structural position of a roof during adverse climatic conditions.

2. Description of the Related Art

Severe storms such as hurricane or tornadoes are likely to cause structural destruction of residential or commercial buildings. Several roof securing systems are available that provide additional strength to roofs of buildings so that they are retained in defined positions when exposed to such storms. Some of the available roof securing systems such as securing straps is difficult to install on ground because of requirement of fresh concrete. Fresh concrete is required for embedding ground anchors which are required to hold securing straps to the ground. Such installations are also time consuming, labor intensive and costly affair. Also, installation and maintenance of available systems is difficult because of requirement of different equipment such as ratchets, chain and turnbuckle. Alternatively, pins or nails are pinned/nailed to securing straps which reduces strength of strap and reduces its life.

Several designs of various roof securing systems have been designed in the past. None of them, however, include a roof securing system that reduces structural destruction in adverse climatic conditions by using fewer components, easy to install and maintain with minimum equipment requirement, minimal efforts and cost.

Applicant believes that a related reference corresponds to U.S. Pat. No. 5,970,677 issued to William C. Masters, William J. Kalker, Jr. titled "Tie connector for modular buildings" discloses a tie connector in which a hurricane strap is inserted to elongates slots and coupled together with a buckle. The buckles are then secured to the ground via hurricane type ground anchors. However, it differs from the present invention because the tie connector of U.S. Pat No. 5,970,677 requires buckle and securing buckles to the ground by using ground anchors which departs from the present invention. Anchoring in ground requires fresh concrete which is associated with more installation time, labor and cost. Other approach provided in U.S. Pat. No. 6,988, 346 issued to Simpson Strong-Tie Company, Inc. titled "Strap holding device" that includes use of fasteners to fasten both a strap holder and a strap with a plurality of structural member and also fasten strap holder with structural member. However, it differs from the present invention because fastening of straps reduces its strength and life and also in case if strap lags then maintaining is difficult as the fastened fasteners needs to be removed which is inconvenient and time consuming.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. Roof securing system of the present invention includes a plurality of securing sets positioned at predetermined distances on rooftop. Each securing set include a strap that is capable of being seated on a rooftop of a residential or commercial building. Each securing set also includes wall mounting fixtures and each wall mounting fixture has at least one opening/slot to receive end portions of strap. Wall mounting fixtures are capable of being tightly secured to side walls of residential or commercial building by using anchor fasteners such that wall mounting fixtures tightly holds strap. Tight holding of strap enables strap to grip roof and hence enable roof to maintain its position during adverse climatic condition. Alternatively, wall mounting fixtures have a second C-portion inserted in an opening of side walls and first flat portion and second flat portion are capable of being tightly secured to side walls of residential or commercial building by using anchor fasteners. Second C-portion is provided with a tube that is configured to receive a hook of a strap, thus securing strap.

It is one of the main objects of the present invention to provide an easy-to-install and maintain roof securing system that is embedded on a roof of building and griped to side walls of building for providing additional structural strength to roof and maintain its position during adverse climatic conditions.

It is another object of this invention to provide a simplified roof securing system that requires that has fewer components, easy to manufacture, requires less fitment time and cost.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings (FIGS. 1 to 5), where the present invention is generally referred to with numeral 10, it can be observed that a roof securing system includes a plurality of securing sets disposed at a pre-determined distances. Each securing set includes wall mounted fixtures 20, a strap 30 and at least one anchor fastener, such as anchor fasteners 40a and 40b.

Figure 1:
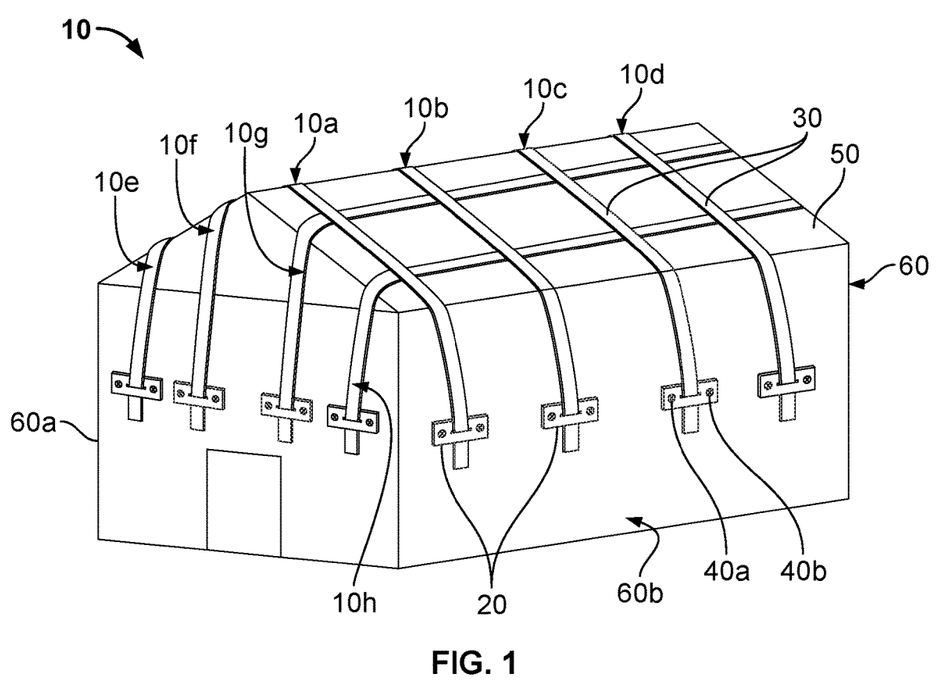
FIG. 1 represents a perspective view of a roof securing system fitted on a residential building, in accordance with one embodiment of the present invention, wherein roof securing system is embedded on a rooftop.
Figure 2:
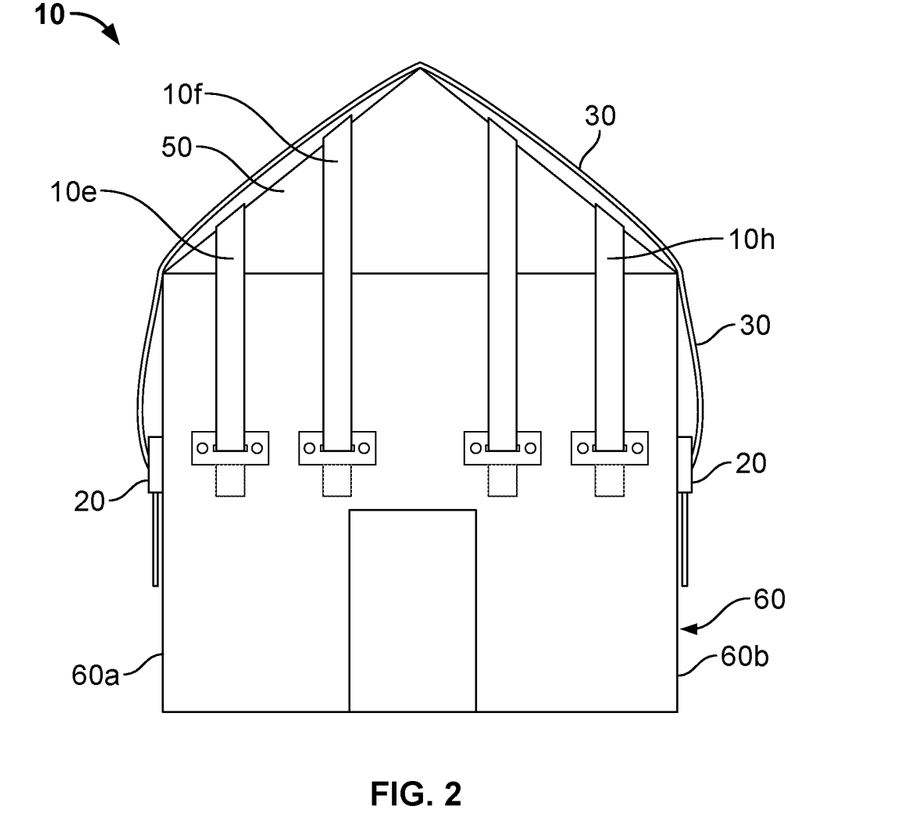
FIG. 2 shows a front view of roof securing system of FIG. 1.

In accordance with an exemplary embodiment, considering FIG. 1 and FIG. 2 in which roof securing system 10 are provided secures a rooftop 50 with respect to rest of building 60. Plurality of securing sets (10a to 10h) is used that are positioned at pre-determined distance with respect to each other. Plurality of securing sets can be positioned longitudinally (10a to 10d) as well as transversely (10e to 10f) on a rooftop 50. The number of sets can be determined by the size and weight of rooftop. More the closeness between adjacently disposed securing sets, more capable roof securing system 10 will be to withstand severe force exerted by severe storm and enable rooftop 50 to be intact with rest of building 60. Though the FIG. 1 depict eight securing sets (10a to 10h) of roof securing system 10, the number of securing sets can be varied as per the need of the invention.

Figure 3A:
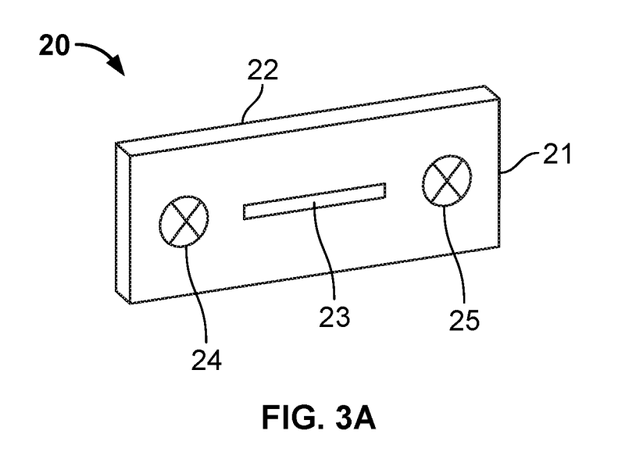
FIGS. 3a to 3c illustrate a perspective view of different types of wall mounted fixture of roof securing system of FIG. 1.
Figure 3B:
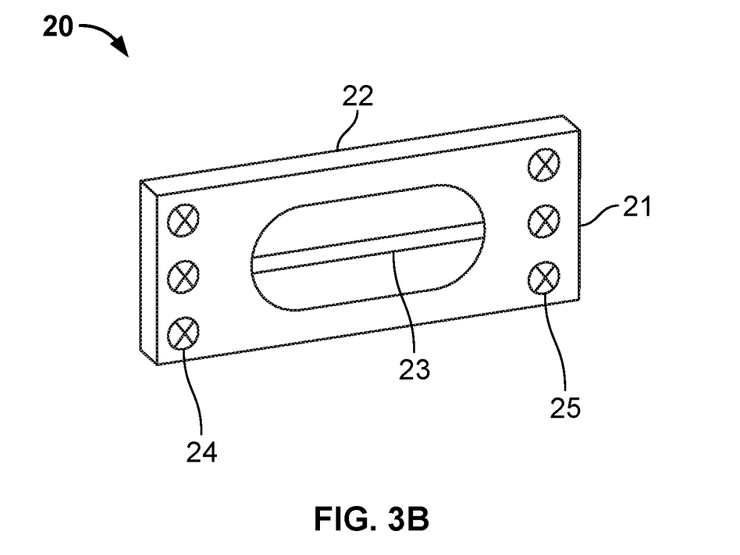
Figure 3C:
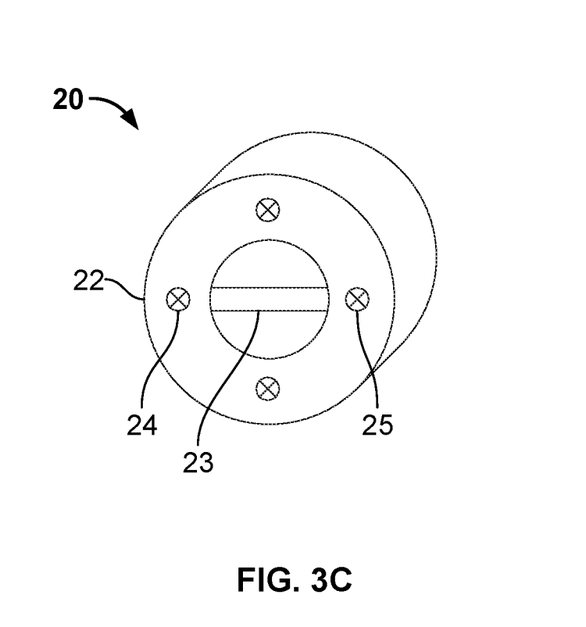

FIGS. 3a to 3c illustrate typical wall mounted fixtures 20 in varies shapes. Each wall mounted fixtures 20 is a substantially flat structure and defined with an upper flat surface 21 and a bottom flat surface 22. Wall mounted fixtures 20 can be of any desired shapes and sizes and not limited to wall mounted fixtures 20 illustrated in Figures of the present disclosure. Wall mounted fixtures 20 are provided with at least one opening/slot 23. Along with opening/slot 23, wall mounted fixtures 20 are also provided with at least one female anchor hole. In FIG. 1 and FIG. 3 as an example, wall mounted fixture 20 is illustrated with two female anchor holes 24 and 25.

Figure 4:
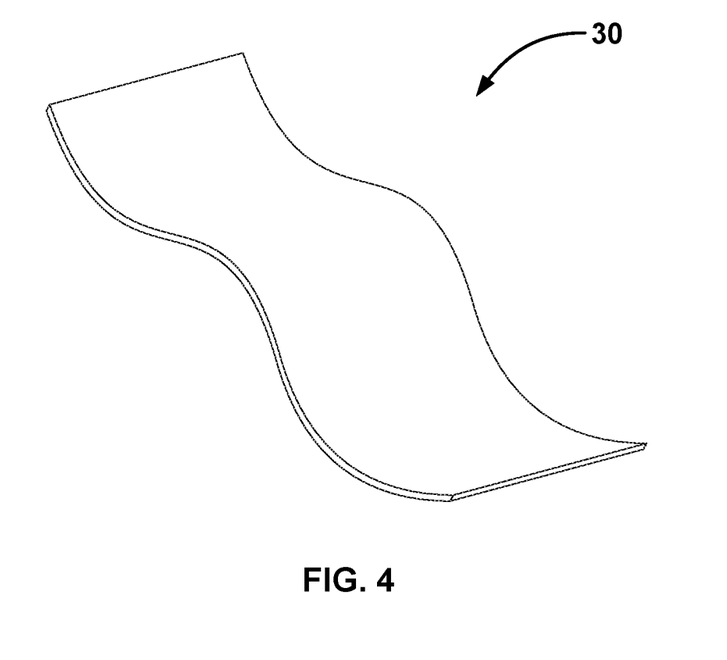
FIG. 4 is an enlarged perspective view of a strap of roof securing system of FIG. 1.

FIG. 4 depicts a perspective view of a strap 30. The strap 30 is longitudinal sheet-like structure. The length of strap 30 is determined such that strap 30 can be positioned around the operative top surface of rooftop 50 and extending both sides till strap 30 covers a substantial portion of side walls 60a and 60b as best seen in FIG. 1 and FIG. 2. The width and thickness of strap 30 are determined according to the size of openings/slots 23 of wall mounted fixtures 20 such that strap 30 can be inserted within opening/slot 23. Either a single wall mounted fixture 20 can be provided on each edge portion of strap 30 or more than one wall mounted fixtures 20 can be provided on each edge portion of strap 30. Size of strap 30 can be varied and determined as per the need of the invention, however, size of strap 30 should be in accordance with the size of opening/slot 23 and the length capable enough to extend along rooftop 50 and a portion of side walls 60a and 60b on either side. The material of strap 30 can be metal, polymeric or any desired make or combination of two or more materials.

Figure 5:
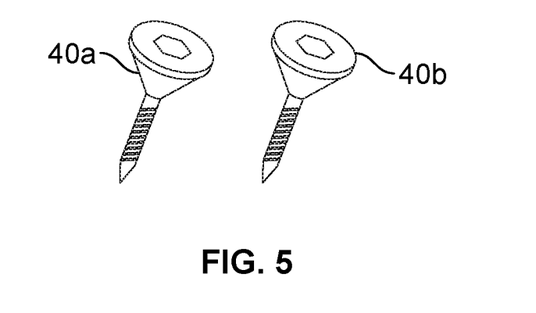
FIG. 5 is a typical perspective view of an anchor fastener of roof securing system of FIG. 1.
Figure 6A:
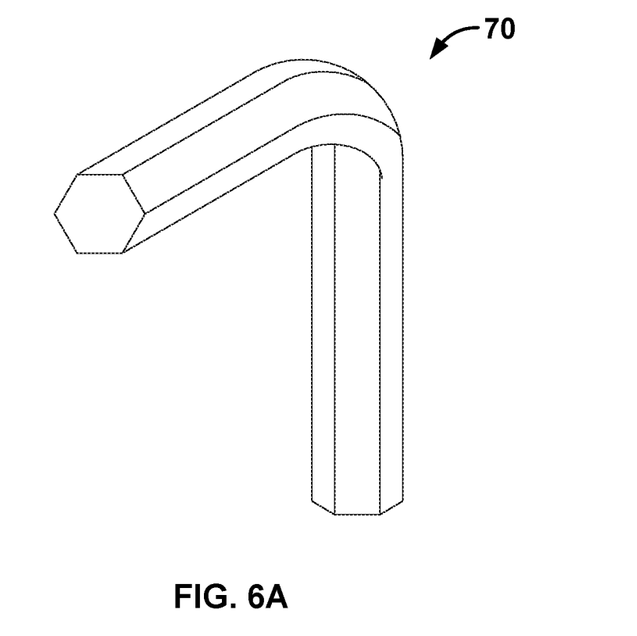
FIGS. 6a to 6b illustrate a perspective and front view respectively of a fastening tool for fixing anchor fasteners.
Figure 6B:
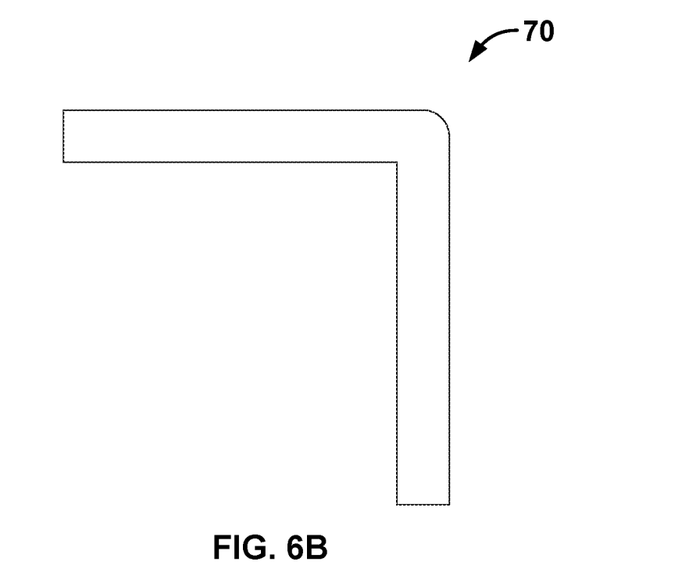

FIG. 5 depicts a typical example of anchor fasteners 40a and 40b. Anchor fasteners 40a to 40b are used to fasten wall mounted fixture 20 to side walls 60a and 60b such that strap 30 which is inserted in opening/slot 23 is fixedly clamped between the side walls 60a and 60b and wall mounted fixtures 20. Anchor fasteners 40a to 40b are inserted in respective female anchor holes 24 and 25 of wall mounted fixtures 20. The number of anchor fasteners 40a to 40b and female anchor holes 24 and 25 can be varied as per the need of the invention but should be minimum one. As illustrated in FIGS. 6a and 6b, anchor fasteners 40a and 40b fixes wall mounted fixture 20 to side walls 60a and 60b by use of a fastening tool(s) 70 that has a portion 70a of shape identical to shape of slot 40c provided on heads 40d and 40e of respective anchor fasteners 40a and 40b. Typically, fastening tool 70 is a german key/allen key.

Figure 7:
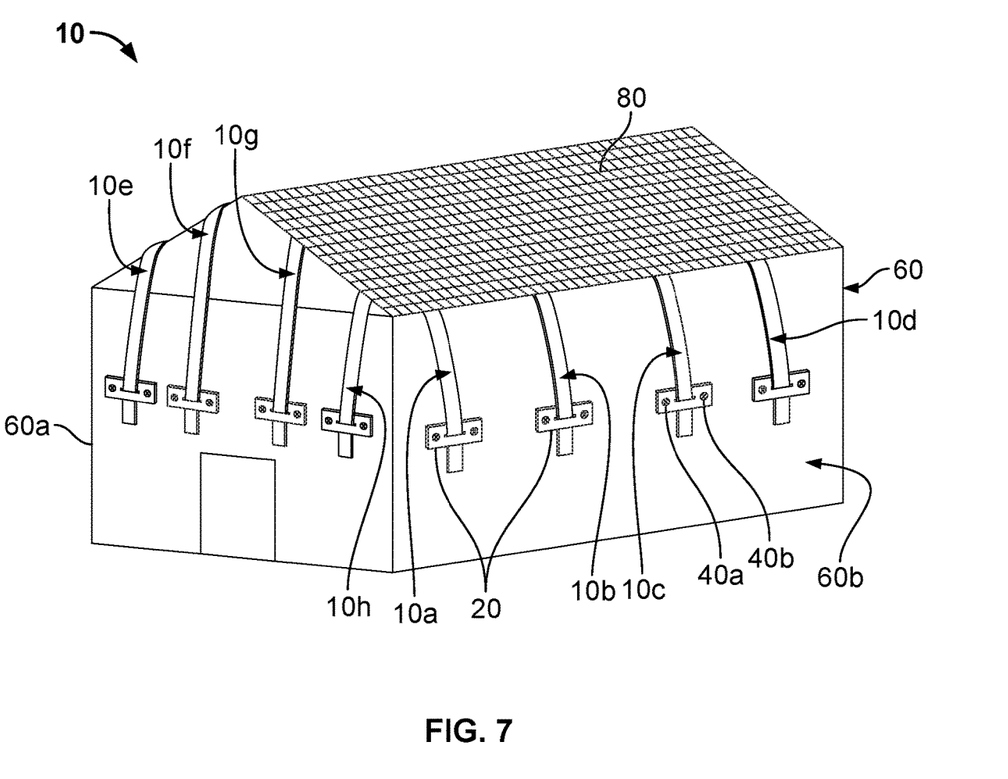
FIG. 7 illustrates a mesh laid over rooftop.

In accordance with one embodiment of the present disclosure as illustrated in FIG. 7, a mesh or net like flexible element 80 is mounted on tile of rooftop 50. Mesh can be of any desired shape and size depending on the need of invention, however, the shape and size can be such that it can obstruct movement of rooftop 50 and other elements (not illustrated in Figures) positioned on rooftop 50. Configuration of mesh can be rope type or chain type depending on the need. Material of flexible element 80 can be fiber of any polymeric material or combination of different materials. Flexible element 80 can be positioned under straps 30 or above straps 30.

The present invention discloses a method adopted for easy fitting of roof securing system 10 to rooftop 50. In a first methodology, strap 30 is directed to spread over the rooftop 50 and wall mounted fixtures 20 are then inserted on either edge portions of strap 30 through opening/slot 23 and both wall mounted fixtures 20 are clamped on oppositely disposed side walls 60a and 60b by anchor fasteners 40a and 40b such that strap 30 tightly secures rooftop 50 with side walls 60a and 60b and in adverse climatic condition prevents rooftop 50 from any undesirable movement. In a second methodology, wall mounted fixtures 20 are hanged on oppositely disposed side walls 60a and 60b by loosely fitting anchor fasteners 40a and 40b and then both edge portions of strap 30 are inserted in wall mounted fixtures 20 (simultaneously or one by one) and then anchor fasteners 40a and 40b are tightly fitted such that strap 30 is wound around operative top surface of rooftop 50 to tightly secures rooftop 50 with side walls 60a and 60b and in adverse climatic condition prevents rooftop 50 from any undesirable movement. Other methodologies of positioning of strap 30 over rooftop 50 and gripping of edge portions of strap 30 on either side walls 60a and 60b by use of wall mounted fixtures 20 that has provision for insertion for strap 30 and by use of anchor fasteners 40a and 40b that tightens wall mounted fixtures 20 to respective side walls 60a and 60b irrespective of the sequence of operation is well within the scope of the present invention. As the installation methodology described herein requires only few steps of operation namely, positioning of strap 30 on rooftop 50, inserting edge portion of strap 30 in wall mounted fixtures 20 and clamping anchor fasteners 40a and 40b to wall mounted fixtures 20 which can be adopted to be carried out in any sequence of operation, the installation method is easy as compared over the existing strapping systems. Also, in case if slag of strap 30 is observed, it is easy to maintain just by loosing of anchor fasteners 40a and 40b and then pulling strap 30 and finally tightening of anchor fasteners 40a and 40b.

Each securing set of roof securing system 10 has fewer components namely strap 30, wall mounting fixtures 20 and anchor fasteners 40a and 40b and hence the system is less complex. Also, the components are easy to manufacture, requires less fitment time and labor and thus benefit to save on cost. Further, less installation and maintenance components are required which makes the method less complex.

Referring now to the drawings (FIGS. 8 to 11), where the present invention is generally referred to with numeral 110, it can be observed that a roof securing system includes a plurality of securing sets disposed at a pre-determined distances. Each securing set includes wall mounted fixtures 120, a strap 130 and at least one anchor fastener, such as anchor fasteners 140a and 140b.

Figure 8:
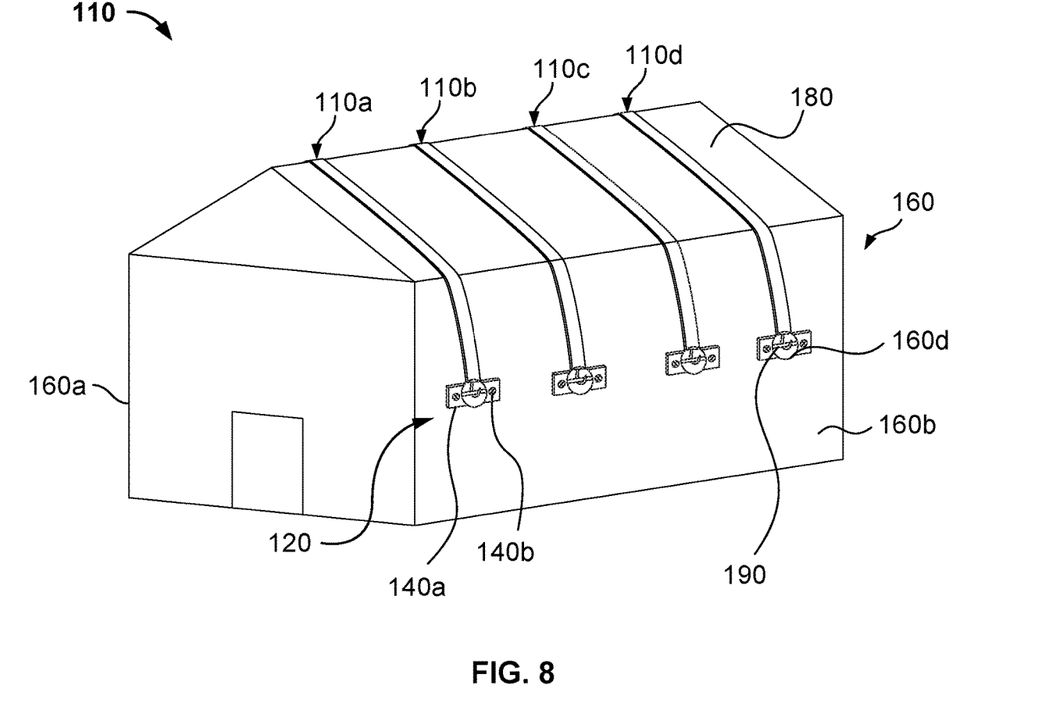
FIG. 8 represents a perspective view of a roof securing system fitted on a residential building, in accordance with another embodiment of the present invention, wherein roof securing system is embedded on a rooftop.

In accordance with an exemplary embodiment, considering FIG. 8 in which roof securing system 110 are provided secures a rooftop 180 with respect to rest of building 160. As per requirement, at determined distances, a plurality of holes 160d is configured in side walls 160a, 160b. Number of holes 160d is equal to the number of securing sets (110a to 110d) required to be secured. Plurality of securing sets (110a to 110d) is used that are positioned at pre-determined distance with respect to each other. Plurality of securing sets can be positioned longitudinally (not illustrated in Figures) as well as transversely (10a to 10d) on rooftop 180. The number of sets can be determined by the size and weight of rooftop. More the closeness between adjacently disposed securing sets, more capable roof securing system 110 will be to withstand severe force exerted by severe storm and enable rooftop 180 to be intact with rest of building 160. Though the FIG. 8 depict four securing sets (110a to 110d) of roof securing system 110, the number of securing sets can be varied as per the need of the invention.

Figure 9:
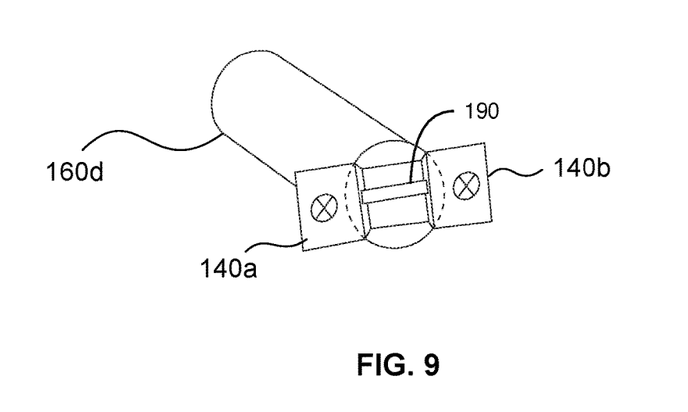
FIG. 9 is a perspective exemplary view of a wall mounted fixture introduced in a hole.
Figure 10:
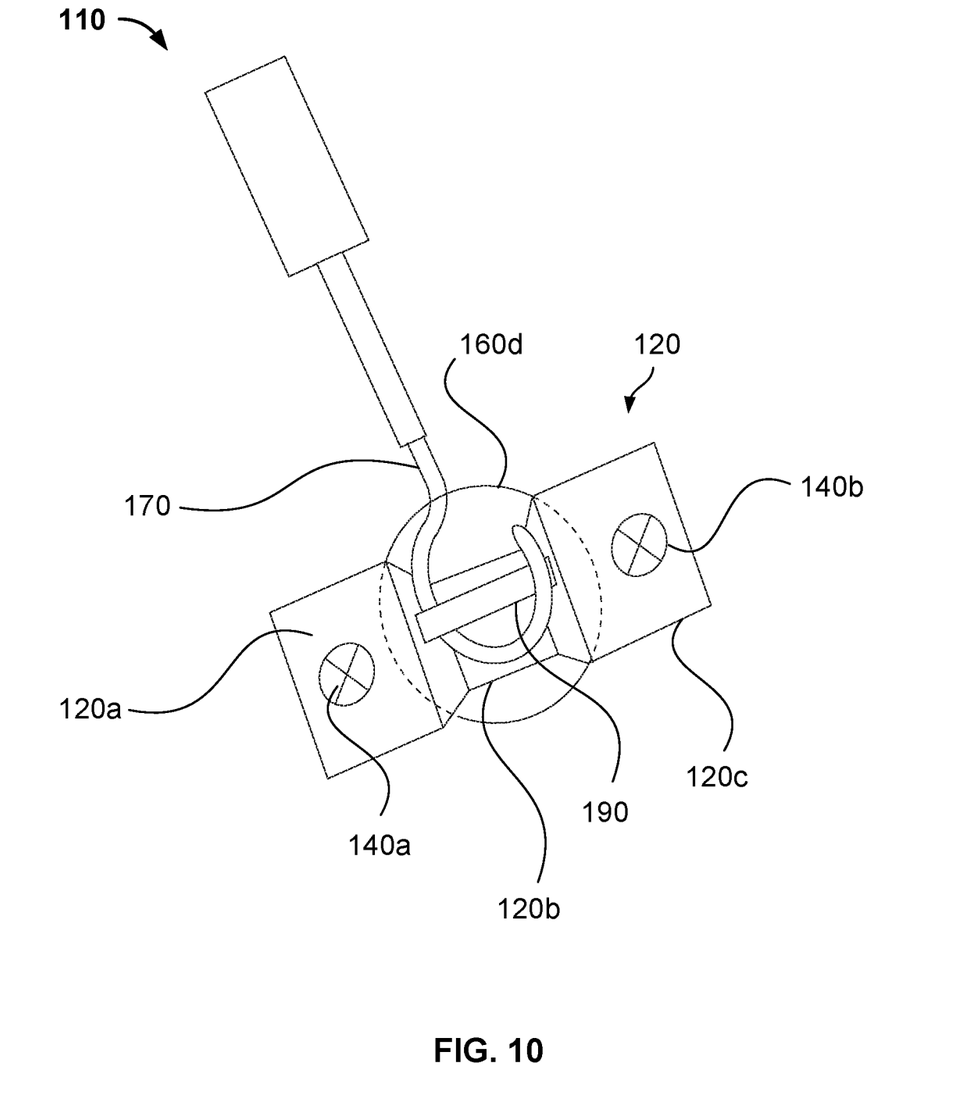
FIG. 10 is a perspective view of a hook of a strap fitted to a tube of wall mounted fixture.
Figure 11:
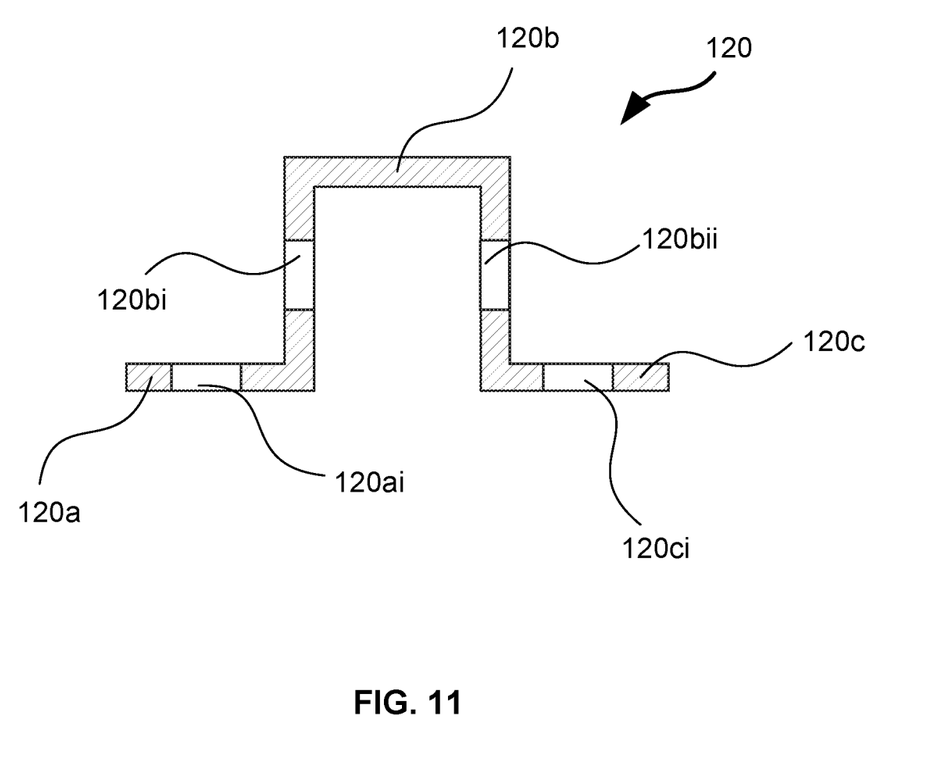
FIG. 11 is a typical view of wall mounted fixture.

FIGS. 9 through 11 illustrate typical wall mounted fixtures 120. Each wall mounted fixture 120 is defined with a first flat portion 120a, a second C-portion 120b and a third flat portion 120c. First flat portion 120a and third flat portion 120c are defined with anchor holes 120ai and 120ci. Each of first flat portions 120a and third flat portions 120c rest on surface of side walls 160a, 160b and anchor fasteners 140a and 140b are used to clamp first flat portions 120a and third flat portions 120c with side walls 160a, 160b. Each C-portion 120b is inserted in respective holes 160d configured in side wall 160a, 160b. C-portion 120b is provided with openings 120bi and 120bii and each opening 120bi and 120bii receives a tube 190. Strap having each of end portions provided with a hook 170 that is inserted in tube 190 to secure strap.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A roof strapping system, comprising:
   (a) a dwelling having perimeter walls and a rooftop;
   (b) a plurality of wall mounted fixtures positioned on each said perimeter wall, each said perimeter wall further including holes;
   (c) said plurality of wall mounted fixtures each having a first flat portion, a second C-portion and a third flat portion, said first flat portion and said third flat portion having anchor holes, wherein said first flat portion and said third flat portion have a rectangular shape, wherein said second C-portion is inserted into said holes of said perimeter wall, wherein said second C-portion rests partially within said holes, wherein a rear side of said first flat portion and said second flat portion rests in a flat position against said perimeter wall, wherein anchor fasteners mount said first flat portion and said third flat portion with said perimeter wall, wherein said second C-portion is provided with openings located on sidewalls of said second C-portion that receive a tube being cylindrical in shape therein to create a slot, wherein said tube extends from a first lateral sidewall to a second lateral sidewall of said second C-portion, wherein said tube rests within an interior space of said second C-portion, wherein said slot receives a strap having a mounting member, wherein said mounting member is a hook;
   (d) a plurality of the straps equal to an amount of wall mounted fixtures;
   (e) said straps having a first and second distal end, said first distal end is passed through said slot on a first said wall mounted fixture and then passed transversely over the rooftop and down along a substantial portion of an opposite said perimeter wall;
   (f) said second distal end is received and secured by an opposite said wall mounted fixture;
   (g) said straps are clamped between said perimeter walls and said wall mounted fixture; and
   (h) a mesh is placed over said straps positioned on said rooftop once all straps are secured to respective said wall mounted fixtures.

2. The roof strapping system of claim 1 wherein each said wall mounted fixture includes three anchoring holes positioned vertically and in sequence with respect to each other on lateral distal ends of said wall mounted fixtures.

3. The roof strapping system of claim 1 wherein each said wall mounted fixture has a cylindrical or circular configuration and an upper flat surface that is a ring, and four anchoring holes positioned at top, left, right, and bottom sides of the ring.

4. The roof strapping system of claim 1 wherein anchor fasteners are used to anchor said wall mounted fixture to said perimeter wall.

5. The roof strapping system of claim 1 wherein an allen key is used as a tool to fasten said wall mounted fixture to said perimeter wall.

6. The roof strapping system of claim 1 wherein said rooftop is flat.

7. The roof strapping system of claim 1 wherein said rooftop is pitched.

8. The roof strapping system of claim 1 wherein said dwelling has a door and said straps are passed over said door and said wall mounted fixtures are mounted to said door to secure said straps over said door.

9. The roof strapping system of claim 1 wherein said straps hang past said wall mounted fixture after having been secured through said slot.

10. The roof strapping system of claim 1 wherein said second C-portion further includes sidewalls being perpendicular to said first flat portion and said third flat portion.

11. The roof strapping system of claim 10 wherein said tube is mounted a predetermined distance below a top edge of said sidewalls.

* * * * *